United States Patent
Hartman et al.

(10) Patent No.: US 10,562,637 B2
(45) Date of Patent: Feb. 18, 2020

(54) TRANSLUCENT ILLUMINATED EVACUATION SLIDE

(71) Applicant: Goodrich Corporation, Charlotte, NC (US)

(72) Inventors: Drew Hartman, Phoenix, AZ (US); Jaro S. Volny, Scottsdale, AZ (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/188,638

(22) Filed: Nov. 13, 2018

(65) Prior Publication Data

US 2019/0077516 A1 Mar. 14, 2019

Related U.S. Application Data

(62) Division of application No. 14/829,369, filed on Aug. 18, 2015, now Pat. No. 10,160,551.

(51) Int. Cl.
*B64D 25/14* (2006.01)
*B64D 47/02* (2006.01)

(52) U.S. Cl.
CPC ............ *B64D 25/14* (2013.01); *B64D 47/02* (2013.01)

(58) Field of Classification Search
CPC ......... B64D 25/14; B64D 47/02; B64D 47/04
See application file for complete search history.

(56) References Cited

U.S. PATENT DOCUMENTS

| | | | |
|---|---|---|---|
| 3,463,915 A * | 8/1969 | Day | B60Q 7/00 362/34 |
| 3,536,906 A * | 10/1970 | Bloom | F21V 3/023 362/362 |
| 3,606,939 A * | 9/1971 | Summer et al. | B64D 25/14 193/25 R |
| 3,621,383 A * | 11/1971 | Rush | B64D 25/14 324/414 |
| 4,179,832 A * | 12/1979 | Lemelson | F21S 2/00 345/32 |
| 4,298,412 A * | 11/1981 | Biddle | C06B 23/04 149/19.1 |
| 4,332,049 A * | 6/1982 | Fisher | A62B 1/20 169/48 |
| 4,434,870 A * | 3/1984 | Fisher | A62B 1/20 182/48 |

(Continued)

FOREIGN PATENT DOCUMENTS

| | | |
|---|---|---|
| EP | 3184432 | 6/2017 |
| WO | 02074620 | 9/2002 |

OTHER PUBLICATIONS

European Patent Office, European Office Action dated Oct. 5, 2018 in Application No. 16184624.1-1010.

(Continued)

*Primary Examiner* — Catherine A Kelly
*Assistant Examiner* — Shiref M Mekhaeil
(74) *Attorney, Agent, or Firm* — Snell & Wilmer, L.L.P.

(57) ABSTRACT

An inflatable evacuation slide is provided. The slide may comprise a slide surface with a tubular member coupled to the slide surface. The tubular member may comprise a translucent material defining a chamber internal to the tubular member. A light source may be directed into the chamber and configured to illuminate the tubular member from within the chamber.

6 Claims, 5 Drawing Sheets

(56) References Cited

U.S. PATENT DOCUMENTS

| | | | | |
|---|---|---|---|---|
| 4,654,098 A * | 3/1987 | Miller | B64D 25/14 | 156/157 |
| 4,774,643 A * | 9/1988 | McGinnis | F21L 2/00 | 362/189 |
| 4,887,780 A * | 12/1989 | Goodrich | B64G 1/14 | 244/137.2 |
| 5,119,281 A * | 6/1992 | Akman | F21V 3/023 | 362/253 |
| 5,152,092 A * | 10/1992 | O'Brien | E01F 9/688 | 40/610 |
| 5,215,492 A * | 6/1993 | Kubiatowicz | A63H 27/10 | 362/253 |
| 5,301,630 A * | 4/1994 | Genovese | B63B 27/14 | 114/375 |
| 5,528,476 A * | 6/1996 | Fenton | A63H 27/08 | 244/155 R |
| 5,586,615 A * | 12/1996 | Hammer | A62B 1/20 | 182/48 |
| 6,082,491 A * | 7/2000 | Collier | A62B 1/20 | 182/206 |
| 6,158,882 A * | 12/2000 | Bischoff, Jr. | F21V 23/005 | 362/249.02 |
| 6,443,259 B1 * | 9/2002 | Oney | B64D 25/14 | 182/18 |
| 6,454,220 B1 * | 9/2002 | Oney | B64D 25/14 | 182/48 |
| 6,626,559 B1 * | 9/2003 | Lin | F21V 3/023 | 362/123 |
| 6,966,414 B2 * | 11/2005 | Zonneveld | A62B 3/00 | 193/25 A |
| 7,018,079 B1 * | 3/2006 | Franco-Vila | A62B 1/20 | 362/253 |
| 7,344,267 B2 * | 3/2008 | Carito | A63H 27/10 | 362/189 |
| 7,478,779 B2 * | 1/2009 | Nguyen | F21V 3/023 | 244/24 |
| 7,766,721 B2 * | 8/2010 | Ma | A63H 33/009 | 446/473 |
| 8,708,101 B2 * | 4/2014 | Bambrick | A62B 1/20 | 182/18 |
| 8,952,828 B2 * | 2/2015 | Kohlmeier-Beckmann | A62B 3/00 | 340/425.5 |
| 9,103,508 B2 * | 8/2015 | Shimizu | F21V 15/015 | |
| 9,399,519 B2 * | 7/2016 | Rivault | B64D 25/14 | |
| 2003/0193803 A1 * | 10/2003 | Lin | F21S 4/24 | 362/249.04 |
| 2004/0094361 A1 * | 5/2004 | Gronlund | B64D 25/14 | 182/48 |
| 2004/0104307 A1 * | 6/2004 | Stokes | B64D 25/14 | 244/137.2 |
| 2006/0291217 A1 * | 12/2006 | Vanderschuit | A63H 27/10 | 362/363 |
| 2008/0223656 A1 * | 9/2008 | John | A62B 1/20 | 182/48 |
| 2010/0246165 A1 * | 9/2010 | Diaz | A63H 27/10 | 362/183 |
| 2015/0060599 A1 * | 3/2015 | Hakam | A63H 27/10 | 244/31 |
| 2015/0264766 A1 * | 9/2015 | Takatsu | H05B 33/0809 | 315/187 |
| 2016/0107732 A1 * | 4/2016 | Plante | B63C 9/20 | 441/129 |

OTHER PUBLICATIONS

Extended European Search Report dated May 29, 2017 in European Application No. 16184624.1.

USPTO: Pre-Interview First Office Action issued in U.S. Appl. No. 14/829,369 dated Mar. 27, 2017.

USPTO: Restriction Requirement issued in U.S. Appl. No. 14/829,369 dated Nov. 21, 2016.

USPTO: Non-Final Office Action issued in U.S. Appl. No. 14/829,369 dated Sep. 14, 2017.

USPTO: Final Office Action issued in U.S. Appl. No. 14/829,369 dated Apr. 9, 2018.

USPTO: Advisory Action issued in U.S. Appl. No. 14/829,369 dated Jul. 2, 2018.

USPTO: Notice of Allowance issued in U.S. Appl. No. 14/829,369 dated Sep. 7, 2018.

* cited by examiner

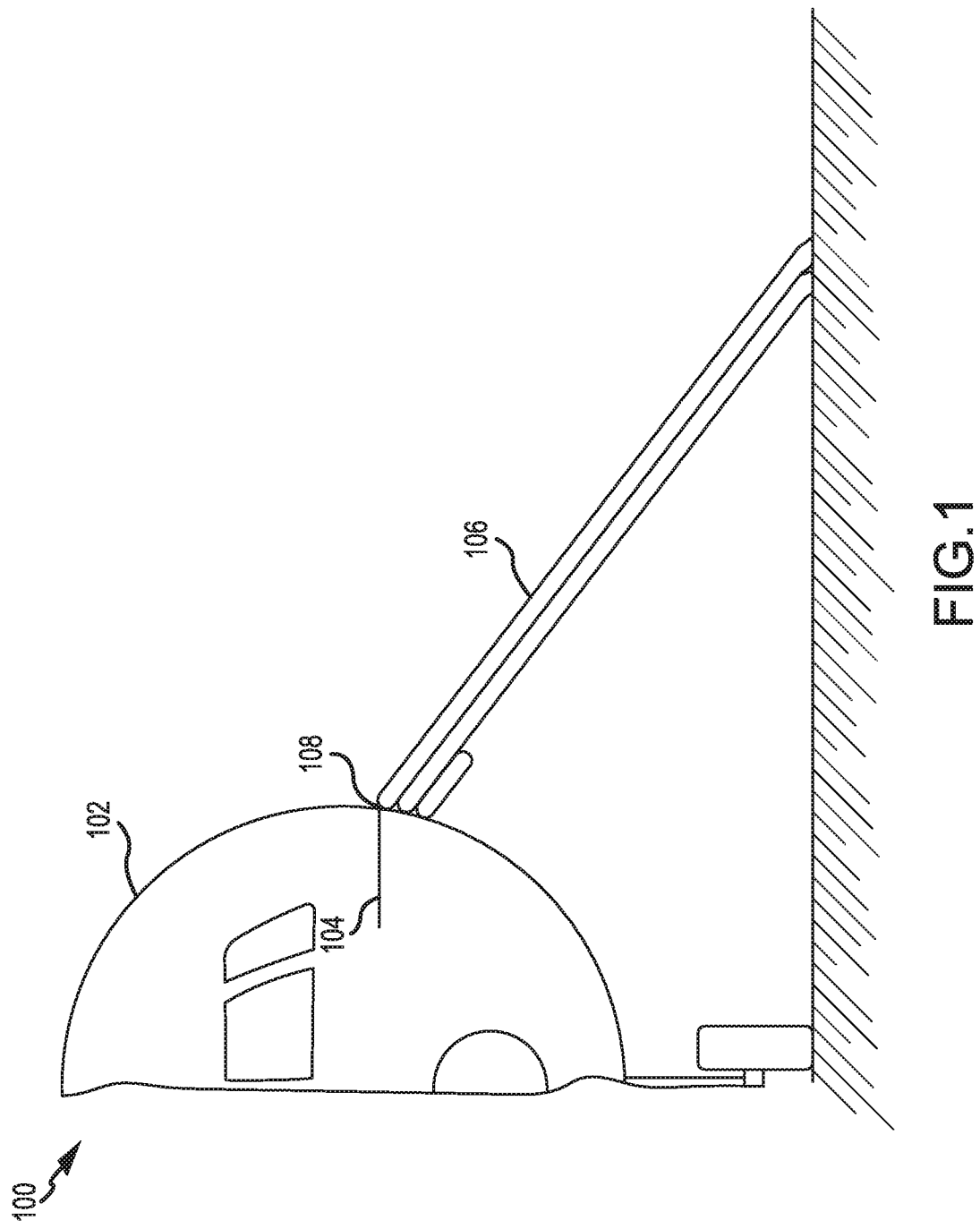

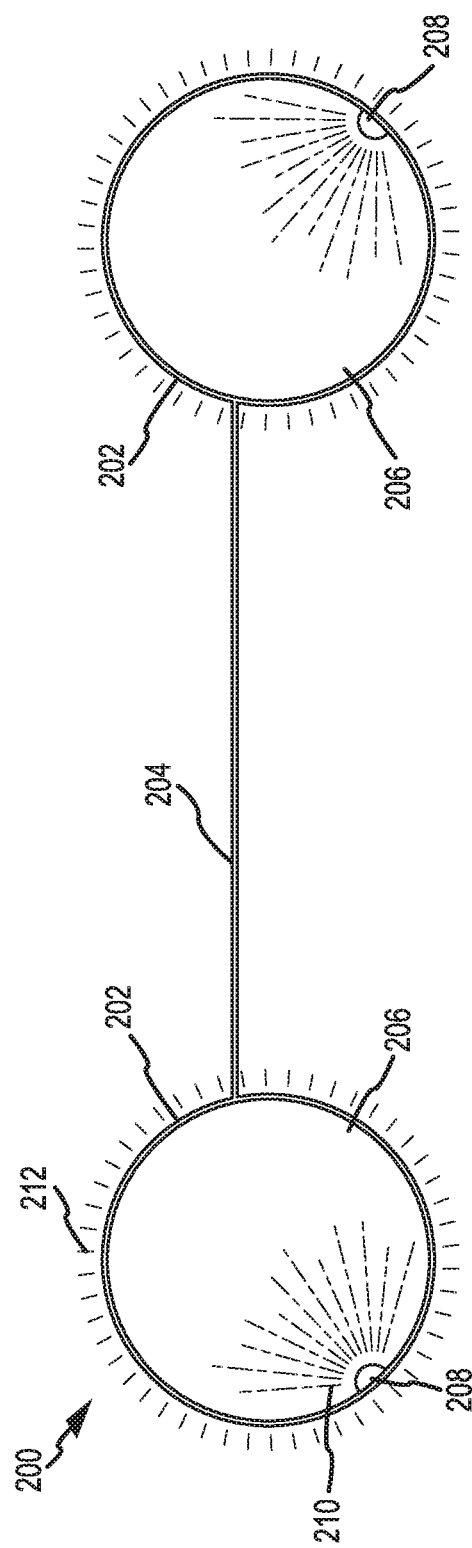

TRANSLUCENT ILLUMINATED EVACUATION SLIDE

CROSS-REFERENCE TO RELATED APPLICATION

This application is a divisional of U.S. patent application Ser. No. 14/829,369, filed Aug. 18, 2015, entitled "TRANSLUCENT ILLUMINATED EVACUATION SLIDE," which is hereby incorporated by reference in its entirety.

FIELD

The present disclosure relates to inflatable emergency slides and, in particular, to an illuminated evacuation slide having translucent skin.

BACKGROUND

Commercial aircraft typically employ evacuation slides that deploy beneath exit doors during evacuation. The evacuation slides may be used in case of emergency by passengers exiting the aircraft. During night evacuations, slide visibility may be limited. Limited visibility may cause hesitation in passengers and slow their evacuation.

SUMMARY

An inflatable slide may comprise a slide surface with a tubular member coupled to the slide surface. The tubular member may comprise a translucent material defining a chamber internal to the tubular member. A light source may be directed into the chamber and configured to illuminate the tubular member from within the chamber.

In various embodiments, the tubular member may comprise a synthetic textile. The synthetic textile may be coated in urethane. The light source may be disposed inside of the chamber. The light source may comprise a light emitting diode and may be disposed external to the chamber. The synthetic textile or the urethane may include a color to add the color to light emitted from the light source.

An evacuation system may comprise a door sill, a girt coupled to the door sill, and a first tubular member defining a first chamber. The first tubular member may be coupled to the girt and comprise a translucent material. A slide surface may also be coupled to the first tubular member. A first light source may be coupled to the first tubular member and configured illuminate the first tubular member from within the first chamber.

In various embodiments, the evacuation system may also include a second tubular member defining a second chamber and coupled to the slide surface. A second light source may be coupled to the second tubular member and configured to illuminate the second tubular member from within. The first light source may be staggered relative to the second light source. The first tubular member may comprise a synthetic textile. The synthetic textile may be coated in urethane. The first light source may be disposed inside of the first chamber. The first light source may comprise a light emitting diode. The first light source may be disposed external to the first chamber. The synthetic textile or the urethane may include a color to add the color to light emitted from the first light source.

An evacuation slide may comprise a first tubular member defining a first chamber. The first tubular member may include a translucent material. A slide surface may be coupled to the first tubular member. A first light source may be coupled to the first tubular member and configured illuminate the first tubular member from within the first chamber. A second tubular member may define a second chamber and be coupled to the slide surface. A second light source may also be coupled to the second tubular member with the second light source configured to illuminate the second tubular member from within.

In various embodiments, the first light source may be staggered relative to the second light source. The first tubular member may comprise a synthetic textile coated in urethane, neoprene, or polyurethane. The first light source may comprise a light emitting diode and may be disposed inside the first chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 1 illustrates an exemplary emergency evacuation system having an inflatable slide, in accordance with various embodiments;

FIG. 2A illustrates a cross-sectional view of an inflatable slide lighted by an internal light source, in accordance with various embodiments;

DETAILED DESCRIPTION

Figure 2B:
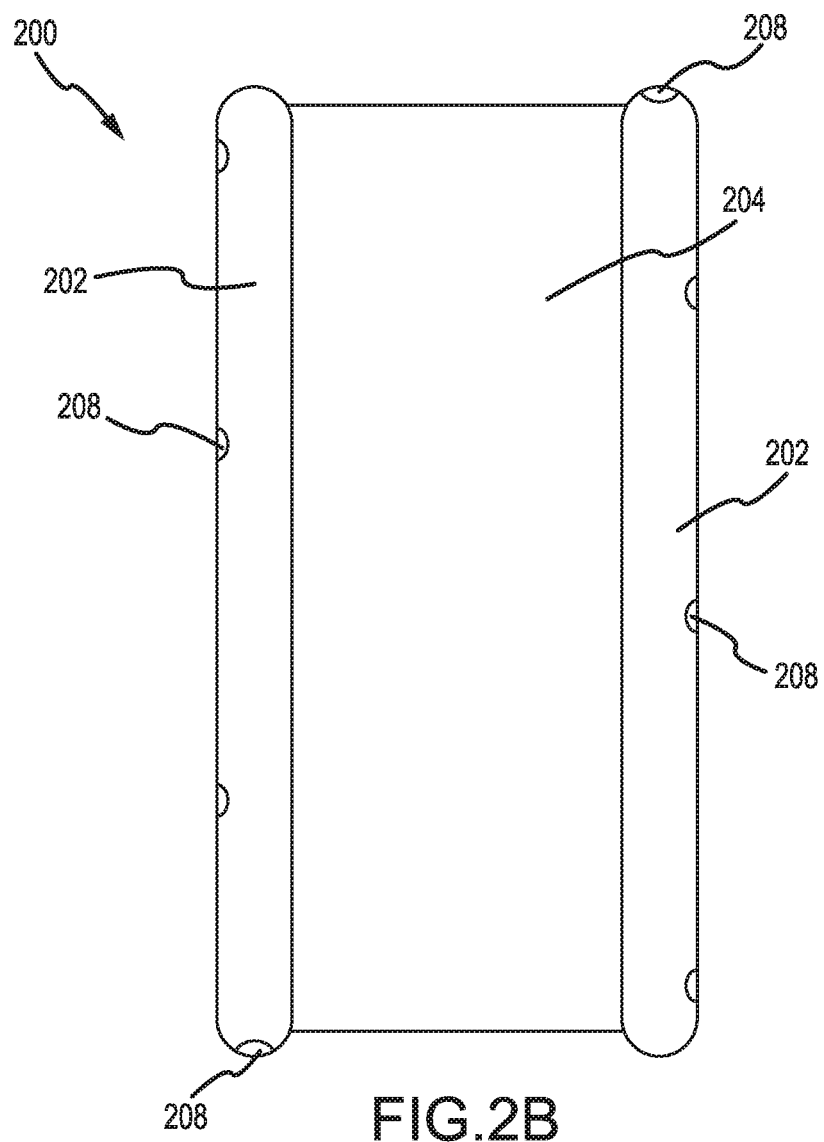
FIG. 2B illustrates a top view of an inflatable slide with internal light sources disposed along the inside of inflatable tubing.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Cross hatching lines may be used throughout the figures to denote different parts but not necessarily to denote the same or different materials.

Slides according to the present disclosure provide improved lighting for night-time use by shining light sources on the skin of the slide. The skin may be translucent or transparent and may distribute light along the skin. In that regard, night time visibility of slide surfaces may be improved by illuminating the surfaces that make up the slide.

With reference to FIG. 1, an exemplary evacuation system 100 is shown, in accordance with various embodiments. Evacuation system 100 may comprise a fuselage 102 with a door sill 104. Inflatable slide 106 may be coupled to door sill 104 by girt 108. Inflatable slide 106 may comprise one or more inflatable chambers made from a translucent, transparent, and/or semi-transparent material with lights disposed at various locations about the inflatable chambers.

With reference to FIG. 2A, a slide 200 is shown having light sources 208 internally located, in accordance with various embodiments. Slide 200 may comprise chambers 206 that are inflatable and defined by tubular members 202. Tubular members 202 may be cylindrical, tubular, rectangular, elliptical, or other suitable shape to provide support for slide 200 when inflated. Chamber 206 may inflate to deploy slide 200 in case of an evacuation event. Slide 200 may further comprise a slide surface 204 coupled to tubular members 202 defining chambers 206.

In various embodiments, slide 200 may be made from translucent, transparent, and/or semi-transparent materials. Translucent materials may include materials having a light transmission rate greater than 20%. Transparent materials may include materials that have a light transmission rate greater than 90%. Translucent, transparent, and/or semi-transparent materials may include sheer textiles. For example, slide 200 may be made from synthetic fibers woven to form a synthetic textile such as nylon, polyester, acrylic, rayon, acetate, latex, or other suitable materials. The textile may be coated to render the material sufficiently air tight to allow for inflation of chamber 206 defined by walls of tubular member 202 made from the textile. For example, the textile may be dipped in or sprayed with urethane, polyurethane, neoprene, or other plastic in liquid form that allows the textile to retain flexibility while making the coated textile impermeable or substantially impermeable to gas. The coating may be applied in a thin layer to retain the light transmission properties of the material. The textile and/or the coating may be colored with a dye or tint to give light emitted from slide 200 a colored hue. For example, the coating may be green to cause the slide to emit a green light in response to light shone through a surface of the slide. The textile may be sewn into a desired shape to form tubular member 202 and slide surface 204 of slide 200.

With reference to FIGS. 2A and 2B, light sources 208 may be disposed on internal surfaces of tubular members 202. Light sources 208 may be light-emitting diode (LED), phosphorescent lights, incandescent lights, florescent lights, light strips, or any other suitable light source. For example, a light source 208 may include multiple LED light engines disposed at intervals along inner surfaces of slide 200 to illuminate slide 200 in a back-lighted, glowing manner. LED lighting may reduce the weight of slide 200 relative to other light sources. LED lighting may also conserve space and provide flexibility relative to other light sources such that light source 208 using LED lighting may be folded and stowed with slide 200 when slide 200 is packed for installation. The brightness and number of light sources 208 may be selected based on power and the total light output criteria.

In various embodiments, light source 208 may be directed inward with light 210 emitted from light source 208 directed into chamber 206. Light 210 emitted from light source 208 may contact an inner surface of tubular member 202 and be partially reflected within chamber 206. Light 210 may be distributed about tubular member 202 in response to being partially reflected by the inner surface of tubular member 202 so that the outer surface of tubular member 202 emits light 212. Light 212 may cause slide 200 to have glowing surfaces where light 212 is emitted. In that regard, the coated textile material of tubular members 202 may diffract and diffuse light 210 from light source 208 within chamber 206.

In various embodiments, light sources 208 may be distributed along tubular member 202 at intervals. For example, light sources 208 may be spaced 6 feet (1.8 m) to 10 feet (3.0 m) apart. Light sources may also be spaced 4 feet (1.2 m) to 12 feet (3.7 m) apart. The spacing of light sources may also be staggered within adjacent tubular members 202 so that tubular members 202 illuminate slide surface 204. Staggered light sources may be located at different points along the lengths of two tubular members 202. Light sources may also be directed at slide surface 204 to illuminate slide surface 204 in a glowing, back-lighted manner as described with respect to tubular members 202. Illuminated surfaces of slide 200 may improve visibility for night-time use.

In various embodiments, light sources 208 may be powered by one or more power sources such as a battery, solar cell, or generator. Light sources 208 may be powered by wires electrically coupled to a power source. Light sources 208 may be wired in series or in parallel to power multiple light sources with a single power source. Light sources 208 may also be self-contained and powered by an individual battery for each light source 208.

Figure 3A:
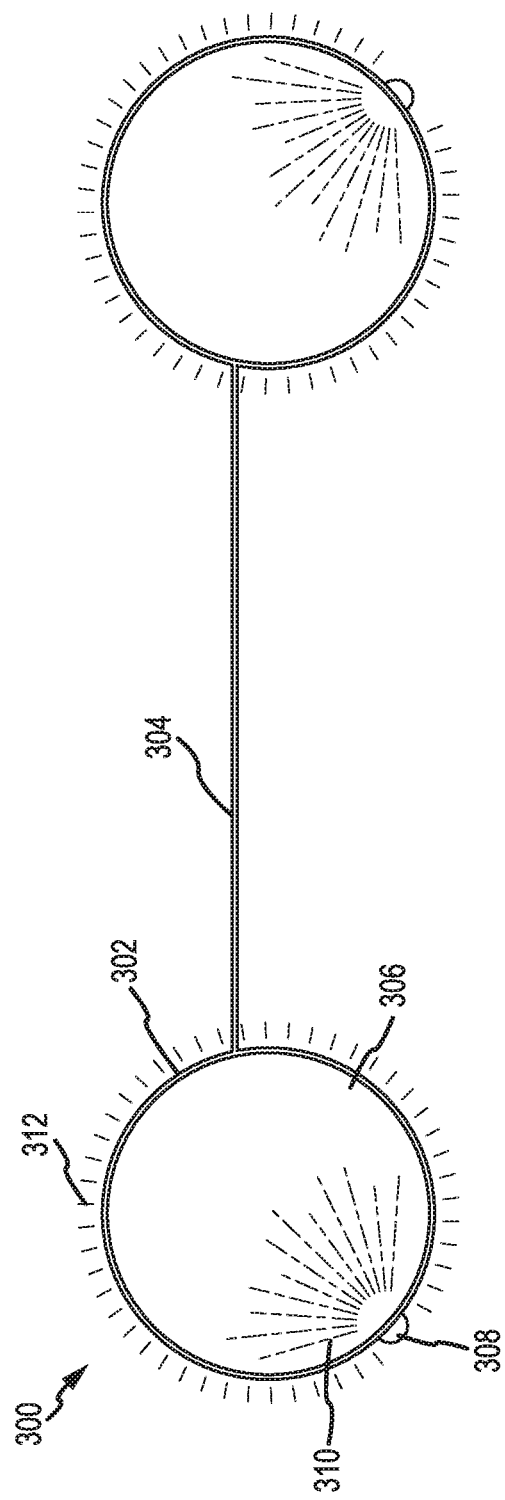
FIG. 3A illustrates a cross-sectional view of an inflatable slide lighted by an external light source, in accordance with various embodiments.
Figure 3B:
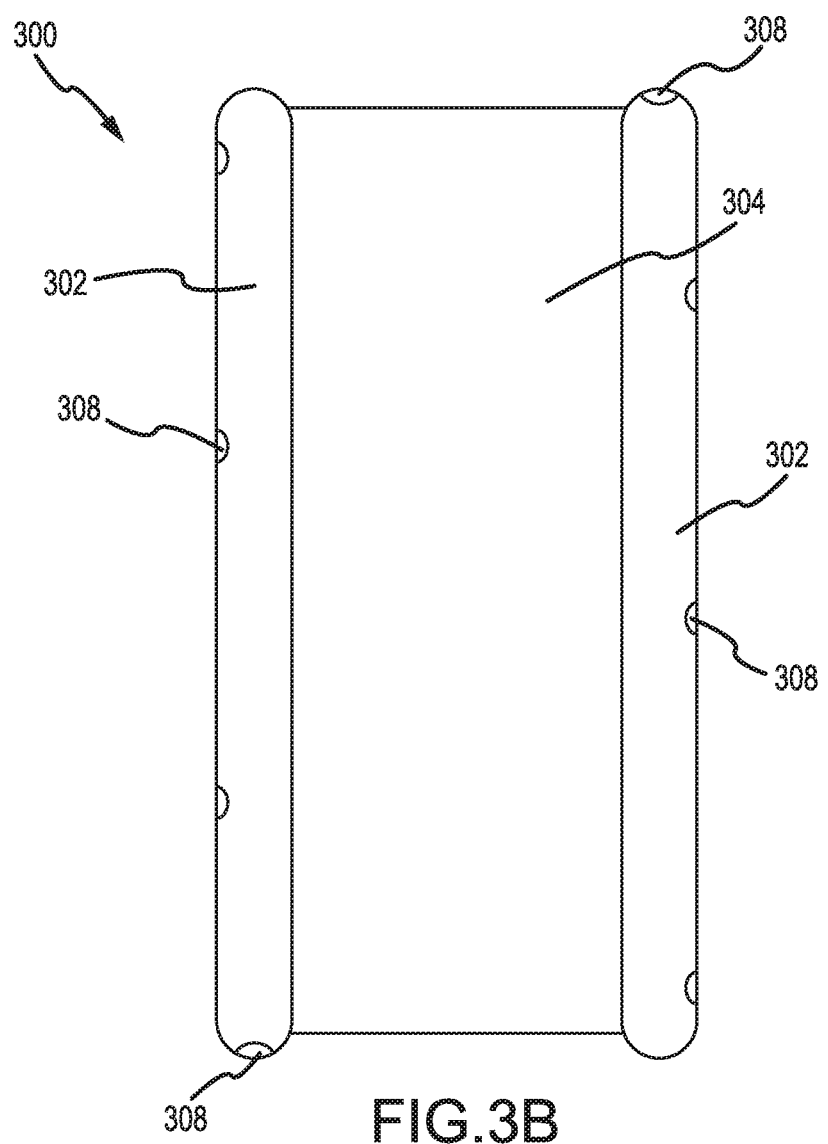
FIG. 3B illustrates a top view of an inflatable slide with external light sources disposed along the outside of inflatable tubing, in accordance with various embodiments.

With reference to FIGS. 3A and 3B, a slide 300 is shown lighted by a light source 308 disposed external to chamber 306, in accordance with various embodiments. Light sources 308 may also be installed in varying orientations on the tube. Installation of light sources 308 on an inside rail may also supply additional lighting on slide surface 304. Slide 300 may be similar to slide 200 of FIG. 2, as described above, but with light sources 308 mounted externally. Tubular member 302 may define a chamber 306 that is inflatable and provides support for slide surface 304 when inflated. Light source 308 is disposed external to chamber 306, on an outer surface of tubular member 302. Light source 308 may be directed into chamber 306 with light emitted from light source 308 entering chamber 306. Light source 308 may shine through the synthetic textile of tubular member 302. A transparent window may be formed in tubular member 302 to enhance light transmission of light 310 into chamber 306. Light 310 within chamber 306 may be distributed about tubular member 302 by diffraction and reflection. Light 312 may be emitted from the outer surface of tubular member 302.

In various embodiments, light source 308 located externally to chamber 306 may be used in conjunction with internally located light sources 208 of FIG. 2A to illuminate a slide 300. In that regard, slide 300 may comprise internally located light sources and externally located light sources. Light sources 308 mounted externally may be LED, phosphorescent lights, incandescent lights, florescent lights, light strips, or any other suitable light source. For example, a light source 308 may include multiple LED light engines disposed at intervals along surfaces of slide 300 to illuminate slide 300 in a back-lighted, glowing manner. Externally mounted LED lighting may conserve space and provide flexibility relative to other light sources such that light source 308 using LED lighting may be folded and stowed with slide 200 when slide is packed for installation.

In various embodiments, light sources 308 may be distributed along tubular member 302 at intervals. For example, light sources 308 may be spaced 6 feet (1.8 m) to 10 feet (3.0 m) apart. Light sources 308 may also be spaced 4 feet (1.2 m) to 12 feet (3.7 m) apart. The spacing of light sources may also be staggered within adjacent tubular members 302 so that tubular members 302 illuminate slide surface 304. Light sources 308 may also be directed at slide surface 304 to illuminate slide surface 304 in a glowing, back-lighted manner as described with respect to tubular members 302. Illuminated surfaces of slide 300 may improve visibility for night-time use.

In various embodiments, light sources 308 may be powered by one or more power sources such as a battery, solar cell, or generator. Light sources 308 may be powered by wires electrically coupled to a power source. Light sources 308 may be wired in series or in parallel to power multiple light sources with a single power source. Light sources 308 may also be self-contained and powered by an individual battery for each light source 308, or light sources 308 may be aircraft-powered.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   a door sill;
   a first tubular member defining a first chamber internal to the first tubular member and coupled to the door sill, wherein the first tubular member comprises at least one of a sheer material, a transparent material or a translucent material;
   a slide surface coupled to the first tubular member; and
   a first light source directed into the first chamber and configured to illuminate the first tubular member from within the first chamber,
   wherein the first light source is disposed external to the first chamber on an outer surface of the first tubular member and wherein light from the first light source is aimed only through the first tubular member.

2. The evacuation system of claim 1, further comprising:
   a second tubular member defining a second chamber and coupled to the slide surface; and
   a second light source coupled to the second tubular member and configured to illuminate the second tubular member from within the second chamber.

3. The evacuation system of claim 1, wherein the first tubular member comprises a synthetic textile.

4. The evacuation system of claim 3, wherein the synthetic textile is coated in urethane.

5. The evacuation system of claim 4, wherein the first light source comprises a light emitting diode.

6. The evacuation system of claim 4, wherein at least one of the synthetic textile or the urethane comprise at least one of a dye or tint to add a color to light emitted from the first light source.

* * * * *